US010783594B2

(12) United States Patent
Stelmar Netto et al.

(10) Patent No.: US 10,783,594 B2
(45) Date of Patent: Sep. 22, 2020

(54) AGRICULTURE MANAGEMENT BASED ON FARMER EXPERTISE AND INTERESTS

(71) Applicant: International Business Machines Corporation, Armonk, NY (US)

(72) Inventors: Marco Aurelio Stelmar Netto, Sao Paulo (BR); Igor Cerqueira Oliveira, Sao Paulo (BR); Bruno Silva, Sao Paulo (BR); Vagner Figueredo de Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/012,309

(22) Filed: Jun. 19, 2018

(65) Prior Publication Data
US 2019/0385244 A1    Dec. 19, 2019

(51) Int. Cl.
G06Q 50/02    (2012.01)
G06Q 10/06    (2012.01)
G06Q 30/02    (2012.01)
A01B 79/00    (2006.01)

(52) U.S. Cl.
CPC .......... G06Q 50/02 (2013.01); G06Q 10/067 (2013.01); G06Q 10/06316 (2013.01); G06Q 30/0203 (2013.01); A01B 79/005 (2013.01)

(58) Field of Classification Search
CPC ............. G06Q 50/02; G06Q 10/06316; G06Q 10/067; G06Q 10/04; G06Q 10/06; H04W 4/38; A01N 25/02
See application file for complete search history.

(56) References Cited

U.S. PATENT DOCUMENTS

| 4,847,784 A | 7/1989 | Clancey |
| 5,870,731 A | 2/1999 | Trif et al. |
| 5,909,669 A | 6/1999 | Havens |
| 6,688,889 B2 | 2/2004 | Wallace et al. |

(Continued)

FOREIGN PATENT DOCUMENTS

| JP | 2002269173 A | 9/2002 | | |
| KR | 2019-0075251 | * 7/2019 | ............ | G06W 50/20 |
| WO | WO-2018176413 A1 | * 10/2018 | ........... | G06Q 10/107 |

OTHER PUBLICATIONS

De Clercq, Matthieu, Anshu Vats, and Alvaro Biel. "Agriculture 4.0: The future of farming technology." Proceedings of the World Government Summit, Dubai, UAE (2018): 11-13. (Year: 2018).*

(Continued)

*Primary Examiner* — Matthew S Gart
*Assistant Examiner* — Hamzeh M Obaid
(74) *Attorney, Agent, or Firm* — Scully, Scott, Murphy & Presser, P.C.; Joseph Petrokaitis

(57) ABSTRACT

Attributes associated with a farming area and production data may be received. A user's expertise level may be identified. At least one crop model may be executed to generate a plurality of scenarios specifying specific actions to perform associated with a farming topic. A production goal associated with the farming area may be received. Based on the production goal and the user expertise level, the plurality of farming scenarios may be filtered to generate at least one candidate scenario. A candidate scenario may be presented for execution. An app such as a chat bot may perform a dialog with the user in executing steps of the candidate scenario.

19 Claims, 8 Drawing Sheets

(56) References Cited

U.S. PATENT DOCUMENTS

| | | | |
|---|---|---|---|
| 6,807,535 B2 | 10/2004 | Goodkovsky | |
| 6,921,268 B2 | 7/2005 | Bruno et al. | |
| 7,153,140 B2 | 12/2006 | Ivanir et al. | |
| 7,286,793 B1 | 10/2007 | Miele | |
| 2002/0103688 A1* | 8/2002 | Schneider | A01B 79/00 |
| | | | 705/7.28 |
| 2006/0014130 A1 | 1/2006 | Weinstein | |
| 2006/0282274 A1 | 12/2006 | Bennett | |
| 2008/0028313 A1* | 1/2008 | Ebert | G06Q 30/02 |
| | | | 715/730 |
| 2011/0276336 A1* | 11/2011 | Sweely | G06Q 50/02 |
| | | | 705/1.1 |
| 2012/0022857 A1* | 1/2012 | Baldwin | G10L 15/22 |
| | | | 704/9 |
| 2013/0226664 A1* | 8/2013 | Rinzler | G06Q 30/0203 |
| | | | 705/7.32 |
| 2013/0282423 A1* | 10/2013 | Hori | G06Q 50/02 |
| | | | 705/7.25 |
| 2013/0325627 A1* | 12/2013 | Kimmerling | G06Q 30/0631 |
| | | | 705/14.66 |
| 2014/0012732 A1 | 1/2014 | Lindores | |
| 2016/0078391 A1* | 3/2016 | Blank | G06Q 50/02 |
| | | | 705/7.42 |
| 2016/0202227 A1* | 7/2016 | Mathur | G06Q 50/02 |
| | | | 702/2 |
| 2016/0232621 A1* | 8/2016 | Ethington | G06Q 10/06315 |
| 2018/0018607 A1* | 1/2018 | Kusui | G06Q 10/06398 |
| 2018/0059691 A1* | 3/2018 | Fleming | G05B 19/0426 |
| 2018/0082223 A1* | 3/2018 | Birger | A01N 25/02 |
| 2018/0342020 A1* | 11/2018 | Sen | G06Q 50/02 |
| 2019/0286968 A1* | 9/2019 | Erpenbach | G06F 16/243 |

OTHER PUBLICATIONS

Cropio, "Change the way of farming with Cropio", https://about.cropio.com/, Accessed on Jun. 19, 2018, 12 pages.
Agrivi, "The most powerful farm management software", http://www.agrivi.com/, Accessed on May 25, 2018, 4 pages.
Agroptima, "The easiest farm management software", https://www.agroptima.com/en/, Accessed on Jun. 19, 2018, 7 pages.
Easy Farm, "Farm Accounting & Management Software", www.easyfarm.com, Accessed on May 25, 2018, 5 pages.
Granular Business, "Run a smarter business with industry-leading farm management software", https://www.granular.ag/farm-management-software, Accessed on May 25, 2018, 3 pages.
Aglytix, "Analytic Scorecard Technologies", http://www.aglytix.com/, Accessed on Jun. 19, 2018, 13 pages.

\* cited by examiner

AGRICULTURE MANAGEMENT BASED ON FARMER EXPERTISE AND INTERESTS

FIELD

The present application relates generally to computers and computer applications, and more particularly to a mobile app and user interface that intelligently manages agricultural growth.

BACKGROUND

One aspect of using technology for agriculture includes acquiring advanced or larger machines to work on the farm. In the current environment, innovation in agricultural field may be related to technologies that help farmers to intelligently manage their crops. These technologies may involve Artificial Intelligence (AI), Internet of Things (IoT), satellite images, and blockchain.

Farmers often have multiple objectives that can be conflicting. For example, these objectives may include, maximizing yield, reducing costs, maximizing storage quality, minimizing energy consumption, maximizing soil sustainability and minimizing risks. Existing tools and farmers may set one objective as the priority (e.g., maximum yield) without considering other objectives. Existing tools may also assume that all users have the same expertise level and may not provide specific recommendations according to particular farmer experience and knowledge.

BRIEF SUMMARY

A computer-implemented method, in one aspect, may include receiving attributes associated with a farming area and production data associated with the farming area. The method may also include identifying user expertise level. The method may further include receiving real-time sensor data associated with the farming area. The method may also include executing at least one crop model, the executing the at least one crop model generating a plurality of scenarios specifying specific actions to perform associated with a farming topic. The method may also include receiving a production goal associated with the farming area. The method may further include, based on the production goal and the user expertise level, filtering the plurality of farming scenarios to generate at least one candidate scenario. The method may further include presenting the at least one candidate scenario to the user.

A system, in one aspect, may include at least one hardware processor coupled to a plurality of sensors sensing data associated with a farm. The system may also include a memory coupled with the at least one hardware processor, the memory storing at least one crop model. The at least one hardware processor may be operable to cause an application to carry on a conversation with a user via a user interface, the at least one hardware processor may be further operable to identify a user expertise level from the conversation. The at least one hardware processor may be further operable to receive farm attributes and production data, and trigger an execution of the at least one crop model based on at least the farm attributes and the production data, wherein executing the at least one crop model generates a plurality of farming scenarios specifying specific actions to perform associated with a farming topic. The at least one hardware processor may be further operable to receive a production goal, and based on the production goal and the user expertise level, filter the plurality of farming scenarios to generate at least one candidate scenario, and present the at least one candidate scenario to the user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems, methods and techniques in some embodiments may provide specific recommendations according to farmers' different expertise levels and different interests to help farmers manage their crops. An aspect of crop management may include farmer expertise levels in achieving an objective. Systems, methods and techniques, in some embodiments, may present different types of feedback and/or advice to users based on their expertise levels. For instance, an interactive tool, for example, built according to systems, methods and/or techniques of the present disclosure according to embodiments, may provide to a user, a series of personalized recommendations on managing aspects of crop production (e.g., fertilization, irrigation), and may cause to achieve a specific goal (e.g., maximum output, minimum water use, minimum soil degradation) determined by the user and the user's expertise.

Figure 1:
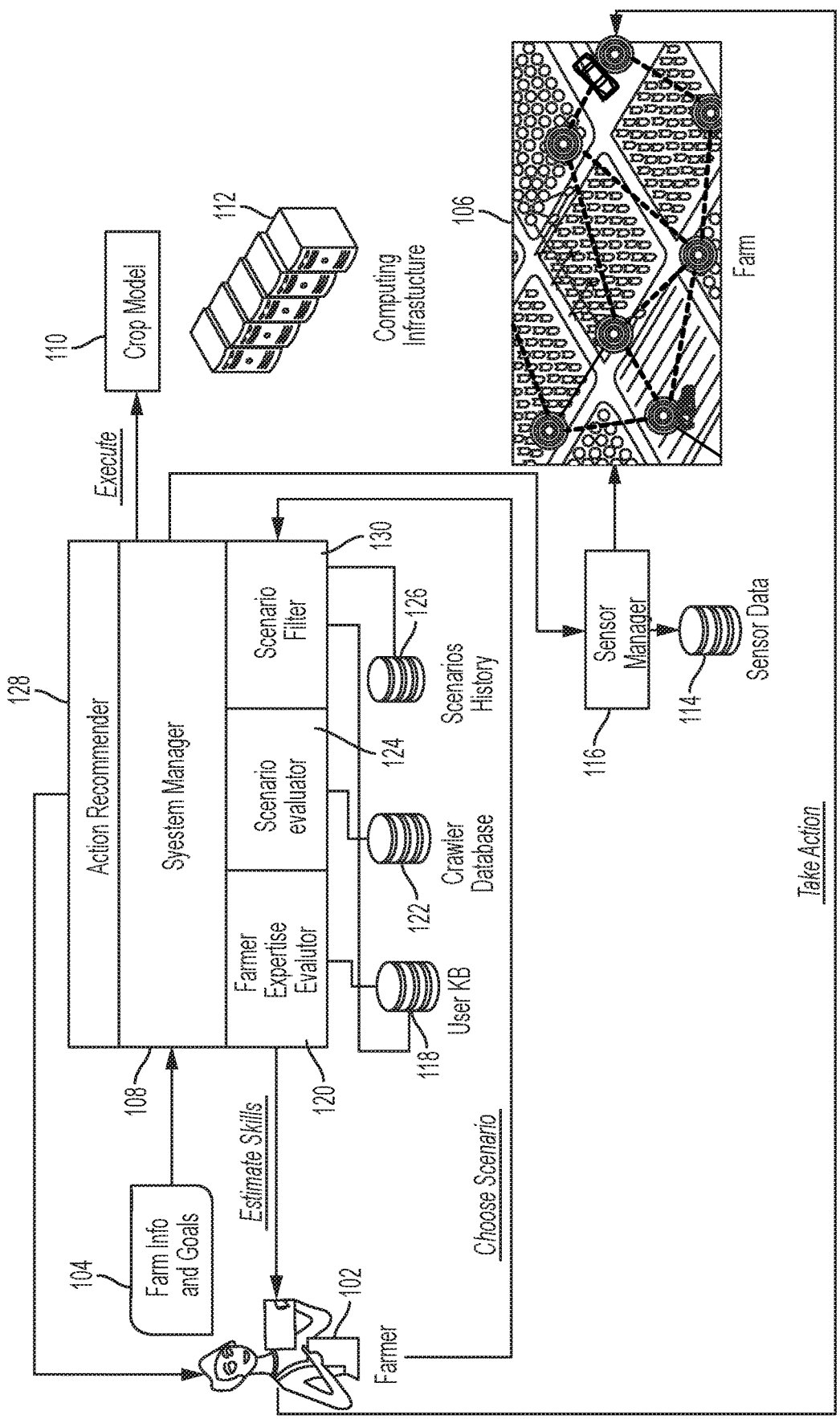
FIG. 1 is a diagram illustrating an overview of a system in one embodiment.

FIG. 1 is a diagram illustrating an overview of a system in one embodiment. Components of a system may include circuitry, for example, one or more hardware processors, which may be coupled with one or more memory devices. Examples of hardware processors may include, but are not limited to, a central processing unit (CPU), a graphics processing unit (GPU), a field programmable gate array (FPGA), an application specific integrated circuit (ASIC), another suitable processing component or device, or one or more combinations thereof.

A farmer may be a user 102 who would like to manage a farm. A farmer's responsibilities may include providing farm information and production objectives 104. A system in some embodiments may provide scenarios to the user 102 for the user to select, and provide recommendation actions. A farm 106 may include an area for growing crops. A system manager component 108 may include software or functionality or programmed hardware (circuit) responsible for controlling the other components and interacting with the user.

The system manager component 108 may also include a backend and frontend functions of a system. One or more functions of the system, for example, may be performed at a backend and/or at a frontend.

A crop model 110 may include software or programmed hardware (circuit), which may simulate farm behavior. The crop model 110 may receive input parameters provided by the user 102 and may collect information from other sources such as weather information from forecast services and/or other services, which may provide information.

A computing infrastructure 112 may include a set of computing resources (e.g., machines and computer network) able to run software and/or various functionalities. The computing infrastructure 112 in some embodiments may run the crop model 110. In some embodiments, the system manager component 108 may be part of computing infrastructure and may be responsible for managing other system components (e.g., action recommender 128, expertise evaluator 120, scenario evaluator 124 and scenario filter 130). The system manager component 108 can be located in a cloud environment, or on-premises.

Sensor data database or data storage 114 may store farm information, such as soil characteristics, temperature, humidity, and/or other data about the farm 106. In some embodiments, a sensor manager 116 may collect data provided by one or more sensors and may store the data in the sensor data database 114. The sensor data database 114 may also provide collected data to the system manager 108. The sensor manager 116 in some embodiments may part of the computing infrastructure 112.

User knowledgebase 118 may store data associated with user expertise and farming skills. A farmer expertise evaluator 120 may include functionality which may evaluate farmer expertise by using data collected by sensors and recommended actions. In some embodiments, the computing infrastructure 112 may also use questionnaires and crawled public data to assess the user's expertise.

Crawler database 122 may include a database or data store which stores farming information used for farming recommendation and farmer expertise assessment. A scenario evaluator 124 may include functionality, which evaluates scenarios generated by a crop model 110 according to one or more goals. A scenario history 126 may include a database or data store which stores farming scenarios and results associated with each scenario. An action recommender 128 may employ user expertise and preferences to suggest actions to farmers.

A scenario may contain a set of parameter values (such as plant date, harvest date, seed type, weather, irrigation strategy, among others), also known as input property, that is executed by the crop model 110. A crop model 110, for example, may be software or the like that computes how a crop grows under these parameter values. The scenario may also include the generated outcome by the crop model (e.g., estimated yield). A user (e.g., a farmer) may specify ranges of parameter values, which may be converted into multiple scenarios.

For example, these ranges can be minimum and maximum dates for planting or harvesting, weather predictions, among others. The data of these scenarios to be stored can be tuples, in which each value in the tuple defines an input property to run the crop model. An example of a tuple may be (10 Jul. 2008, 10 Sep. 2018, soy, genetic type A), which represents, plant date, harvest date, crop type, and the genetic cultivar. A tuple may include other data values. The crop model 110 may be executed with these input parameters, and the execution of the crop model 110 may generate an outcome (e.g. estimated yield). By using the different possible inputs, a large number of possible crop evaluations (e.g., scenarios) can be generated. By using the user goals (e.g., maximum yield) the best scenario can be selected or used.

Figure 2:
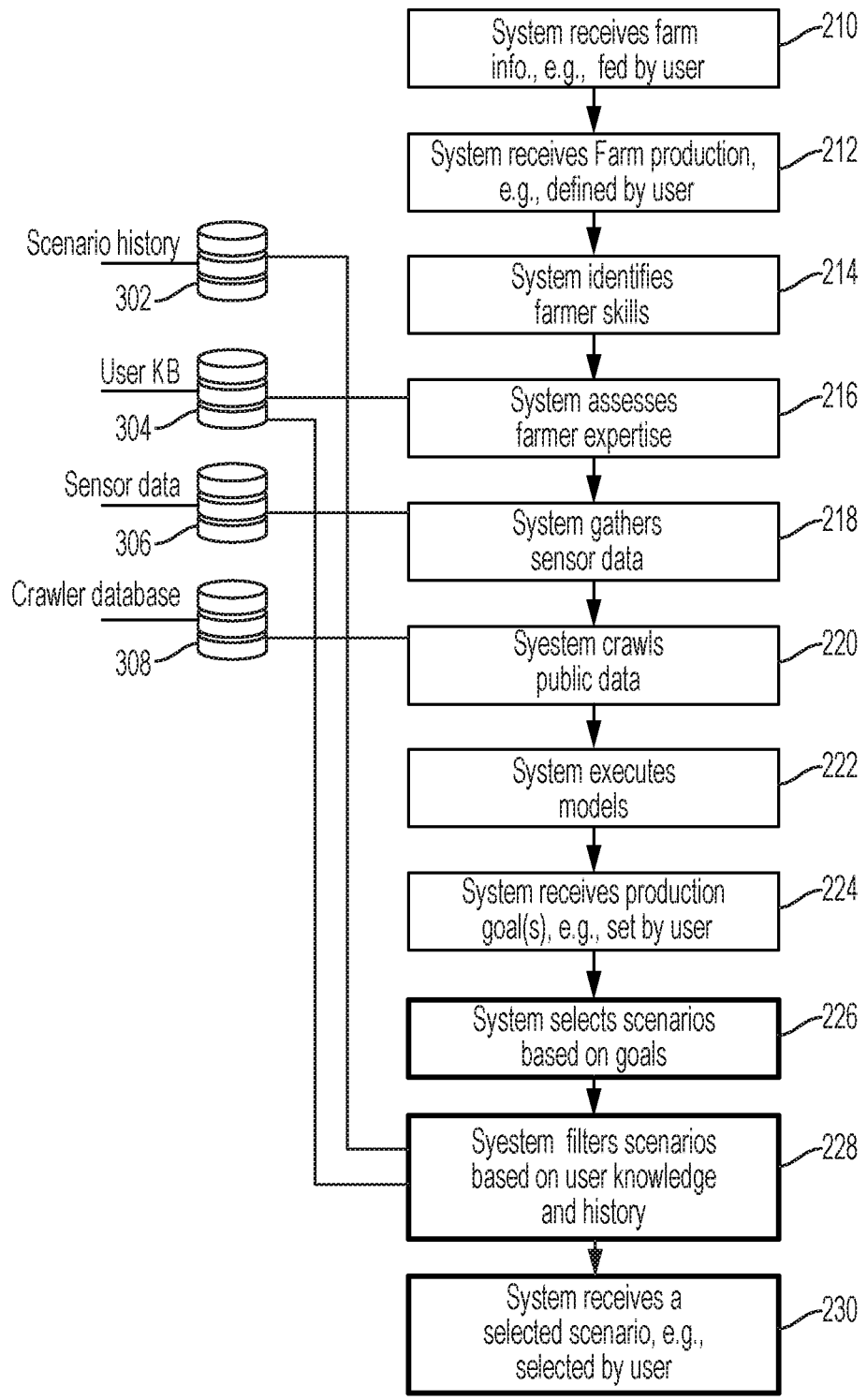
FIG. 2 is a diagram illustrating a method of setting up a system in one embodiment.

FIG. 2 is a diagram illustrating a method of setting up a system in one embodiment. The method may be implemented on and/or executed by at least one hardware processor, such as a central processing unit (CPU) coupled with a memory device, as an example. At 210, a system (e.g., one or more hardware processors) in some embodiments, may receive information associated with a farm, for example, from a user. Information associated with a farm, for instance, may include data such as, but not limited to, defining area of a farm, type of the soil in the area, altitude, and other crop or farm information. The information retrieved at 210 may reflect static or long term characteristics of the farm.

At 212, a user may define farm production, and, for example, the system may receive farm production or productions data (e.g., defined by the user), for instance, one or more types of crops, cattle, forest, and/or others. For instance, the user enters one or more types of farm production, which the farm may produce currently. For instance, a user may define such data and input to the system, via a user interface.

At 214, the system may identify farmer skills (e.g., the user's farming related skills). A skill may be an activity that the farmer is able to conduct. The farmer skills associated with this user (e.g., farmer) may be stored in a knowledgebase or a database 304, e.g., user knowledgebase 304. A user knowledgebase 304, for example, may store data associated with user expertise and farming skills, for example, a user's knowledge related to irrigation, a new crop, crop rotation, other crop related information, financial market, weather, pests, and/or other knowledge. In some embodiments, the system may map the skills and expertise level that the system can use to support the user (e.g., the farmer), and store the map in the user knowledgebase 304. For example, the user knowledgebase 304 may store a plurality of records or data relating to a plurality of users, respectively, for example, a database record or set of records per user.

At 216, the system may assess farmer expertise. A skill may be an activity that the farmer is able to conduct and a farmer expertise may refer to how well the farmer can conduct this activity. This assessment may consider a plan for the user goal (e.g., the defined or desired production). For example, a plan for the user goal may include one or more of optimizing the production for maximum yield, minimizing water usage, and/or maximizing sustainability. In some embodiments, the assessment can be performed, for example, by receiving information from the user, for example, via conversational interface, chat bots, question and answer session, surveys, questionnaire, quizzes, which may include an interactive session with the user via a user interface for information. A chat bot, for example, refers to a computer program, which may employ artificial intelligence and natural language processing technique to conduct a conversation autonomously with a user, for instance, by text or speech (e.g., voice) processing.

For example, the system may assess the farmer skills to provide personalized hints about the crop management process. The system may identify farmer's skills and/or expertise by using different strategies. For example, the system may use a questionnaire, chatbot, and/or quizzes to measure the farmer expertise in a given skill. Depending on the responses provided by a user, the system may estimate farmer's expertise. As another example, the system may use sensor data to verify user actions and estimate users expertise and skills. For instance, sensors may measure the soil moisture after irrigation to verify farmer's irrigation expertise. As another example, the system may check soil properties to estimate farmer's fertilization expertise. Crop models can be used to establish an expected outcome and sensor data may be used to measure the difference between the expected and actual farming activity results.

For example, the system may use questionnaires specific for each skill and/or expertise level and according to the score achieved by the farmer, the mapping between skill/ expertise level can be achieved. As another example, the difference between expected outcome and measured data can used to assess farmer expertise in a given skill.

Table 1 illustrates example mappings of skills and expertise levels. Different mappings may be used or generated, for example, for instance, using (LOW, MEDIUM, HIGH) scales.

TABLE 1

| SKILL | EXPERTISE LEVEL | ESTIMATION TIME |
|---|---|---|
| IRRIGATION | 80% | YYYY-MAY-21 |
| FERTILIZATION | 60% | YYYY-MAY-21 |
| TRANSPORTATION | 90% | YYYY-JUN-15 |
| WEATHER | 70% | YYYY-JUN-15 |

At 218, the system may gather sensor data available at the farmer's location (e.g., sensor data related to the farm), for instance, by communicating with one or more sensors deployed to detect information about the farm. Sensor data may be stored in a sensor data database 306. Sensor data database or data storage 306, for example, stores farm information, such as soil characteristics, temperature, humidity, and/or other data about the farm, for example, sensed by a plurality of sensor. Sensor data database 306 may store a plurality of records or set of records associated with a plurality of farms, respectively. For example, a database record or set of records per farm area may be stored.

In some embodiments, sensor data may be used to measure outcomes related to farming activities. In some embodiments, the measurements may be used to estimate and/or update farmer expertise on a given skill. In some embodiments, the measurements may be used to improve the farming hints presented to the user. For instance, the system may advice the user to irrigate 1 mm of water in a specific farm area. After the irrigation process, the system may measure the expected soil moisture and estimate the farmer expertise on irrigation skills. The sensor data can also be used to update the crop model. The sensor data for example may be real-time data, and for example, may be volatile and may change over time. Examples of sensor data may include, but are not limited to, soil moisture, air humidity, solar radiation, potassium concentration. These values may change on a daily basis and may have a high impact on crop performance.

At 220, the system may crawl public data, e.g., the Internet and World Wide Web (Web) sites. For instance, a Web crawler such as an Internet bot and/or a search engine may browse the Web sites to examine the Web content or available public data. Crawling of the public data gathers structured and/or unstructured data available to the farmer, e.g., papers, reports, weather information. Data obtained from the crawling may be stored in a crawler database 308. In some embodiments, crawled data may be used for updating crop models. For example, data obtained from crawling or searching the Internet or the like may be used to provide weather information to crop models. As another example, data obtained from crawling or searching the Internet or the like may be used to update the models with new farm management practices and new genetic cultivars. For instance, a news article may indicate that a new genetic cultivar has been released by a Seed company. The system can crawl this data and update the next suggestions to include this new cultivar.

At 222, the system may execute one or more models. Examples of models may include, but are not limited to, production crop, transportation, and finance models. Models previously generated, such as crop, transportation, and finance models may be used to provide predictions and estimate the best recommendations based on user goals and expertise. Such models may use weather, genetic cultivar, and farming management information as input. These inputs can be obtained from the user, sensor and/or crawled data. The output of the models may include crop yield (e.g., kilogram per hectare (kg/ha)), leaf area index (e.g., square centimeter (cm2)), and time at maturity (e.g., days). Executing a model may generate a plurality of scenarios.

At 224, a user may set a production goal, for example, via a user interface. Examples of goals may include, but are not limited to, water consumption, production, time to produce, and/or others.

At 226, the system may select one or more scenarios based on the production goal or goals entered by the user. In some embodiments, a mixed strategy that uses the production goals and user expertise may select scenarios to suggest. In some embodiments, users may define a risk profile to receive a recommendation, and the system may receive the risk profile and based on the risk profile and a production goal (e.g., received at 224), the system may suggest scenarios of higher or lower risks.

As an example, by executing the models (e.g., crop, transportation, and/or financial models), the system can generate a set of scenarios by varying the possible inputs of the farming activities. For instance, the crop model can be executed with 3 different approaches:

Scenario 1—Without irrigation.
Scenario 2—With irrigation using technique #1.
Scenario 3—With irrigation using technique #2.

The system may execute the crop model with the scenarios and check the predicted production and the probability of success of activity. Suppose the outcomes for the crop model are the following.

Scenario 1—Production 2000 kilogram per hectare (kg/ha), probability of success for activity 99% (No action was taken).

Scenario 2—Production 3000 kg/ha, probability of success for activity 90%. Farmer has high level of expertise on this action (e.g., irrigation using technique #1). The estimation was taken by using sensor data and/or questionnaires.

Scenario 3—Production 3500 kg/ha, probability of success for activity 30%. Farmer skills related to irrigation technique #2.

The probability of success can be calculated based on how much the farmer is following a recommended scenario. For instance, consider that the user followed A from the total of B activities from a selected scenario. In this example, the system may compute the probability of success as A/B. Depending on user preferences (e.g., production goal set at 224), the system can recommend a high risk approach and highest outcome related to the goal (Scenario 3), or a moderate approach medium risk and medium outcome (Scenario 2).

At 228, the system may filter scenarios (e.g., if at 226 more than one scenario is selected). In some aspects, scenarios may be filtered based on user knowledge and history of previous uses of recommendations. For instance, the system may filter out the scenarios that depend on missing user skill or that are not present in the history of the farm. The system, for example, may consider farmer expertise and keep scenarios that include actions that the user knows how to perform (e.g., skill and expertise).

At 230, a user may be allowed to select a scenario from the filtered scenarios. For instance, a user interface may be provided via which a user may select a filtered scenario, and the system receives the user's selection.

Figure 3:
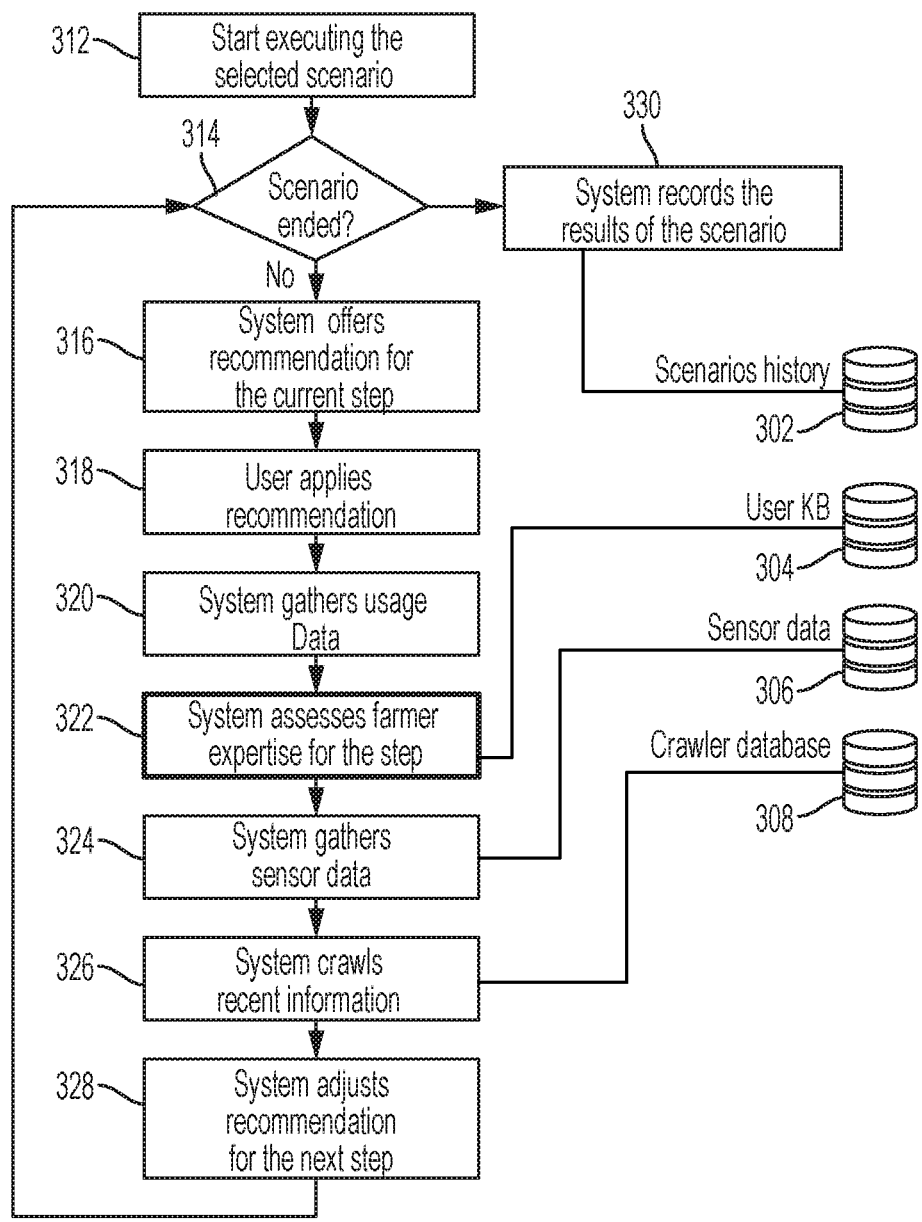
FIG. 3 is a diagram illustrating a system use in one embodiment.

FIG. 3 is a diagram illustrating a system use in one embodiment. At 312, a user is allowed to start a selected scenario, for example, selected at 230 in FIG. 2. For instance, via a user interface, the user may start the selected scenario by clicking on the selected scenario on a user interface, or by another indication, for example, on a user interface. The system, in response, may present steps and/or actions to perform to obtain the user goal set at 224. The user, in response, may execute the steps and/or actions specified in the selected scenario.

At 314, it is determined as to whether the executing of the scenario has ended. Responsive to determining that the scenario has ended, at 330, the system may record the results of the scenario, for example, in a scenarios history database 302. Examples of scenario results may include production, irrigation, and other goals set at 224. Such database may be stored in a storage device. Results of the scenario may be used in future executions of models such that the future executions of models can consider what the farmer executed in the past. If at 314, it is determined that the scenario execution has not ended, the logic of the processing continues to 316.

At 316, the system may offer a recommendation for a current step being executed in the scenario. The scenario, for example, may include multiple steps. Each of these steps may need to be performed in a specific way. The system may recommend or specify how each step may be performed.

At 318, the user may apply the recommendation. For example, the user may perform a recommended or specified step or action. An example of a step or an action may include planting the recommended seed, setting up the recommended irrigation type, or another action.

At 320, responsive to the user applying the recommendation, the system may gather usage data. Usage data, for instance, may include the effect of the user applying the recommended scenarios steps. For instance, sensor data can determine if the activities recommended by the scenario were performed or not. Usage data informs the system how the user is consuming the provided recommendation.

At 322, the system may assess or reassess the user's (farmer's) expertise associated with the step executed. This assessment may be performed in the same or similar manner as described with reference to FIG. 2 at 214 and 216. For instance, the system may present a question or a verification of the current step status of the selected scenario.

At 324, the system may gather sensor data, monitoring the progress of the current scenario. In some aspects, the system may query a sensor data database 306 to receive current data about the farm.

At 326, the system may crawl Web sites or the like for recent information. In this way, more updated information may be provided to the farmer (user). The processing at 326 allows the system to re-assess the impact of the activities executed by the user after the scenario recommendation. The processing at 326 may include executing the model again with the new information retrieved.

At 328, the system may adjust a recommendation for the next step. In this processing, the system may considers how the selected scenario is being run and provide adjustments, if any, considering, e.g., sensor data, information gathered from the news, and/or how the farmer executed the current recommend step. By crawling previous information (324, 326), the system can check if the activities recommended were performed or not. If some actions were not performed (or were poorly performed) the system can compute the impact on achieving the goal (e.g., defined at 224 in FIG. 2) and make appropriate recommendations to make the goal achievable.

The logic of the processing returns to 314, and may repeat until the scenario ends.

Figure 4:
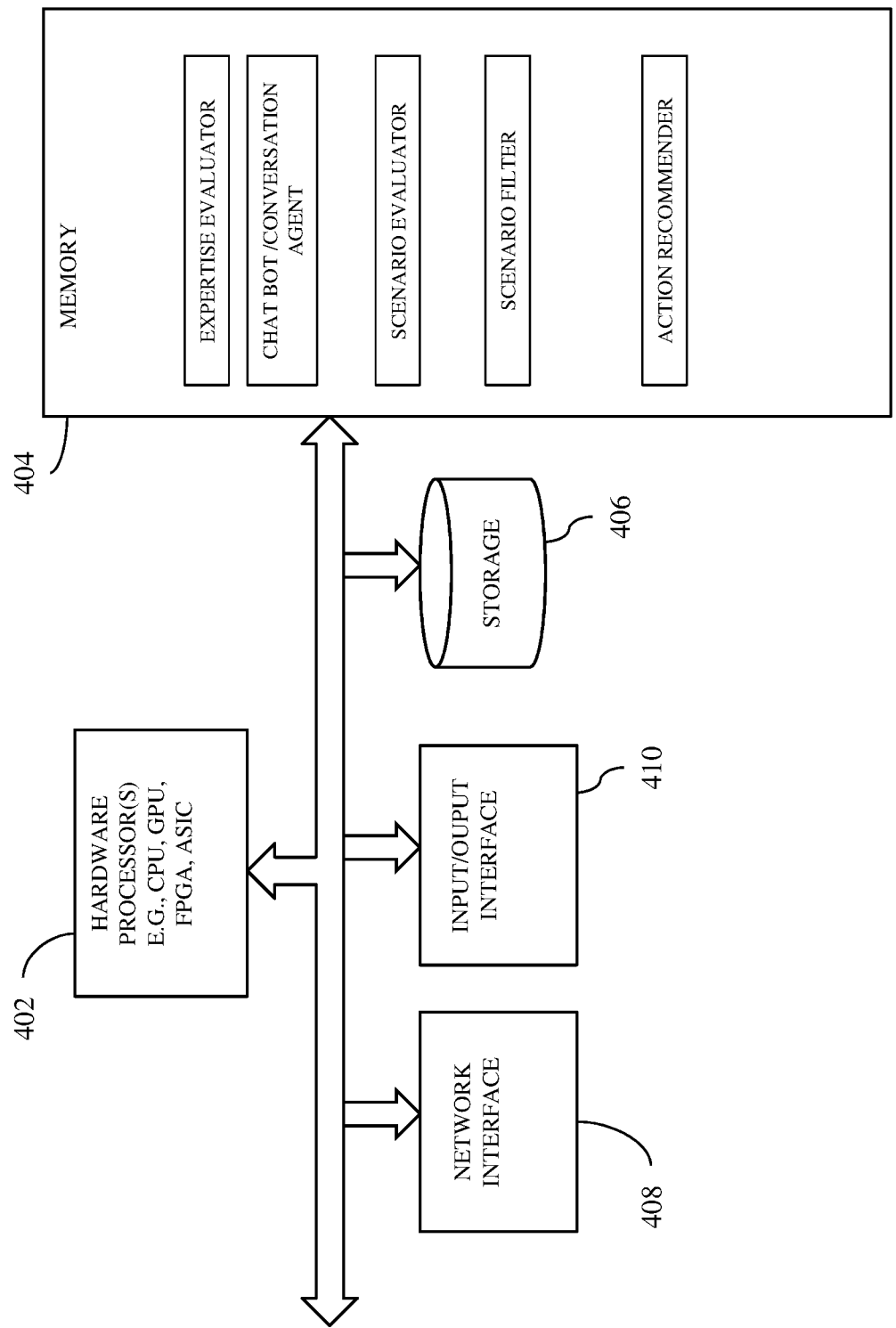
FIG. 4 is a diagram showing components of a system in one embodiment.

FIG. 4 is a diagram showing components of a system in one embodiment. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and execute to provide agricultural management functions such as providing recommendations specific to farmer expertise and interests. One or more of such hardware processors may be embedded on a circuit circuitry. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 404 may, for example, store instructions and/or data for functioning of the one or more hardware processors 402, and may include an operating system and other program of instructions and/or data. The one or more hardware processors 402 may receive input data such as farm information and defined farm production, and production goals. At least one hardware processor 402 may generate one or more agriculture related recommendations specific to a particular farmer expertise and interest. In some embodiments, an application such as a chat bot may be run to carry on a dialog or a conversion session with a user, to query the user. Information received from the conversation may be used to identify or further assess or determine a user's expertise level. In some aspects, various data may be stored in a storage device 406 or received via a network interface 408 from a remote device, and may be temporarily loaded into the memory device 404 for providing agriculture management as described herein. Computer instructions may be loaded onto memory 404, for perform functionalities such as expertise evaluation, scenario evaluation, scenario filtering and action recommendation, for execution by one or more hardware processors (e.g., CPU or another processor). In some embodiments, such functionalities may be programmed on one or more hardware processors (e.g., FPGA or another processor). The one or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5C:
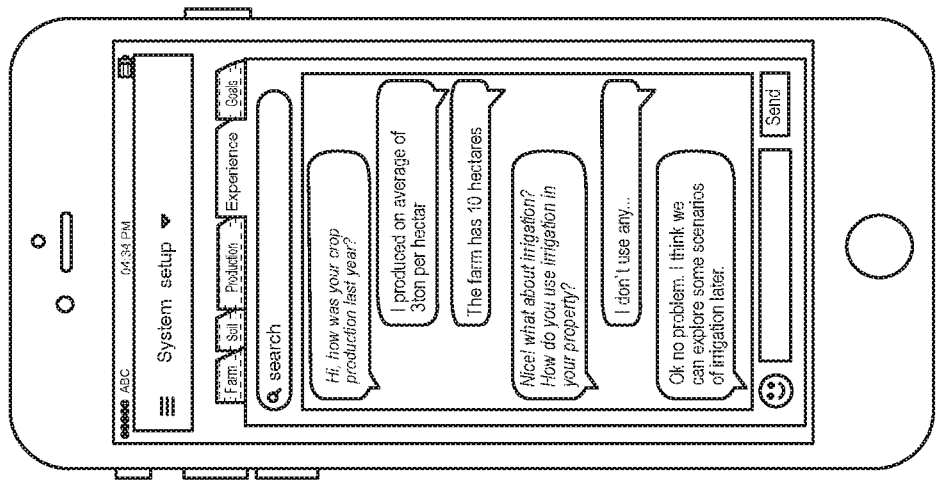
FIGS. 5A-5G illustrate examples of user interface displays via which a system in some embodiment may interact with a user in providing agricultural management in one embodiment.
Figure 5B:
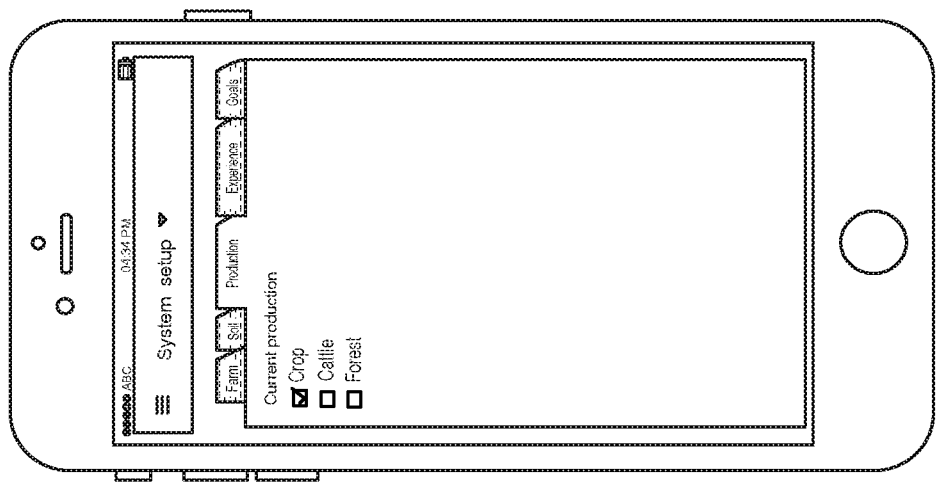
Figure 5A:
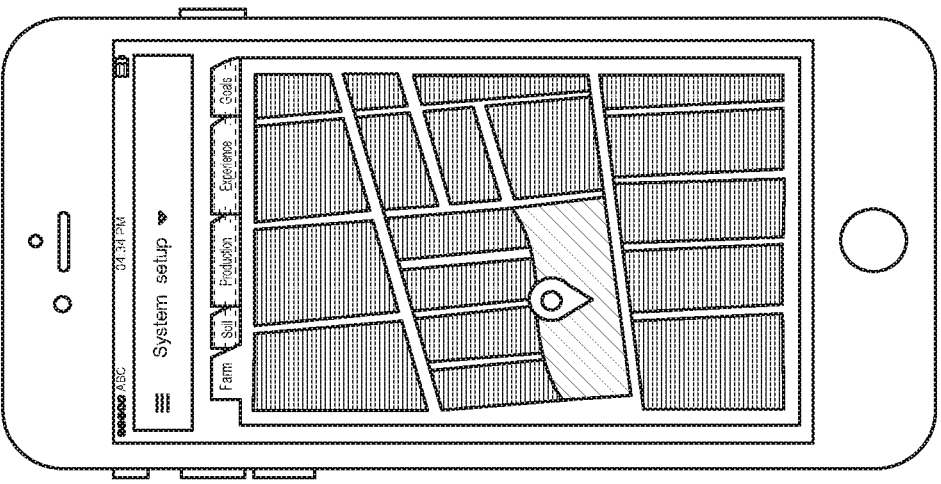

FIGS. 5A-5G illustrate examples of user interface displays via which a system in some embodiment may interact with a user in providing agricultural management in one embodiment. In some embodiments, a method of the present disclosure may be implemented as a mobile app (application), which may include a graphical user interface, for example, as shown in FIGS. 5A-5G. A user interface, for instance, may include and present multiple screen displays, for example, in multiple tabs or pages, which are associated with implementing functionalities described with reference to FIG. 2 and FIG. 3. Referring to FIGS. 5A-5E, a user interface which may implement system set functionalities, for example, described with reference to FIG. 2, is shown. For instance, a system setup user interface may include displays associated with "Farm", "Soil", "Production", "Experience" and "Goals". Referring to FIG. 5A, a user interface display allows a user to enter information about a farm. For instance, the user interface may display a map of a region, and the user may be allowed to select an area on the map to provide information about the location of the farm and perimeters or boundaries of an area containing the farm. The method and/or system in some embodiments may receive the user input associated with the information entered via this user interface (e.g., described with reference to FIG. 2 at 210).

Referring to FIG. 5B, a "Production" user interface display allows a user to select or define current production, e.g., crop, cattle, forest, and for example, the method and/or system in some embodiments may receive the user input associated with the production (e.g., as described with reference to FIG. 2 at 212). Other productions may be displayed for selection.

Referring to FIG. 5C, a user interface display may include a page via which a system and/or method in some embodiments may present questions to query for user experience, and allows a user to interactively enter information about the use's experience. In some embodiments, a chat bot or like conversational agent may be employed to conduct a conversational session with the user. In some embodiments, based on the conversation, the system and/or method may identify farmer skills or farming skills of the user or the farmer, for instance, as described with reference to FIG. 2 at 214 and/or 216. For instance, knowledge assessment and/or mapping of skills and topics may be performed based on the information obtained from the conversation.

Figure 5E:
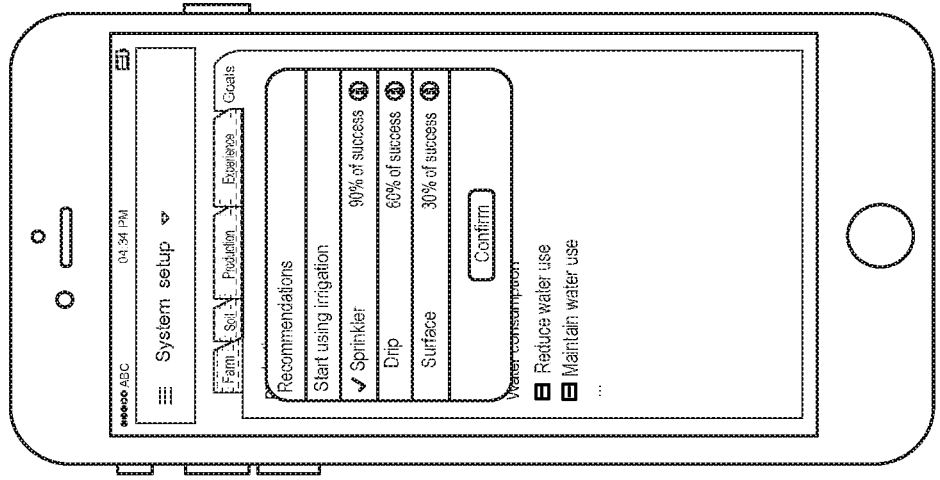
Figure 5D:
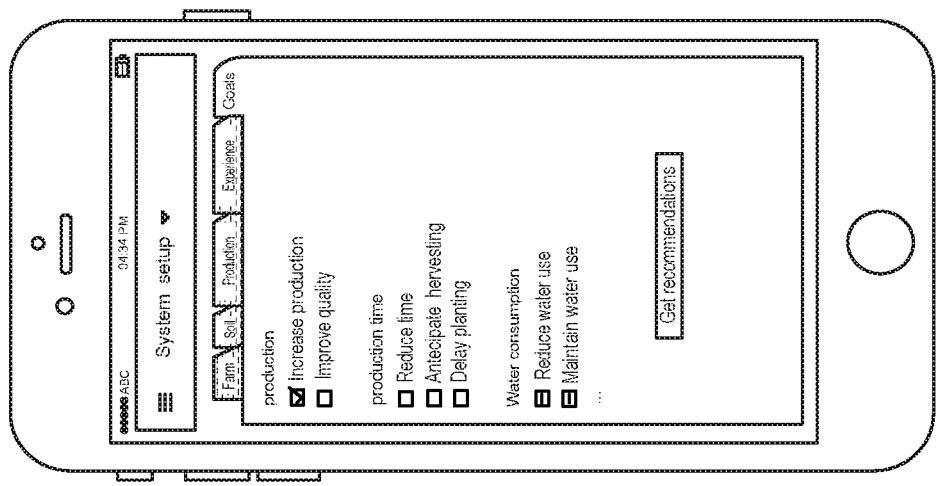

Referring to FIG. 5D, a user interface display may include a page via which a system and/or method in some embodiments may present fillable or selectable information to allow a user to enter the production goals the user desires to achieve, and receive the entered production goals. This page may also present an icon on the graphical user interface page for allowing a user to select to get recommendation. The system and/or method in some embodiments, in response to the user selecting or pressing (otherwise acting on the icon) may proceed to execute one or more functions in providing a specific customized recommendation based on the user's expertise level and interest (e.g., goal).

FIG. 5E shows an example user interface display, which presents one or more system generated recommendations in one embodiment. In some embodiments, a recommendation may be displayed over the user interface pages or tabs, for example, as a pop up display. In some embodiments, uncertainty and/or risk may be mitigated via the recommendations. Recommendations may include options, which a user may select. Selecting and option and selecting a "confirm" button, or like user interface icon may trigger an execution of a scenario, for example, of using irrigation, or particular irrigation method selected. After the scenarios are simulated, the system can compute a probability of the defined goal (e.g., at 224 in FIG. 2) to be achieved. The % values shown in FIG. 5E represent an example of the computed probability of the defined example goals.

Figure 5G:
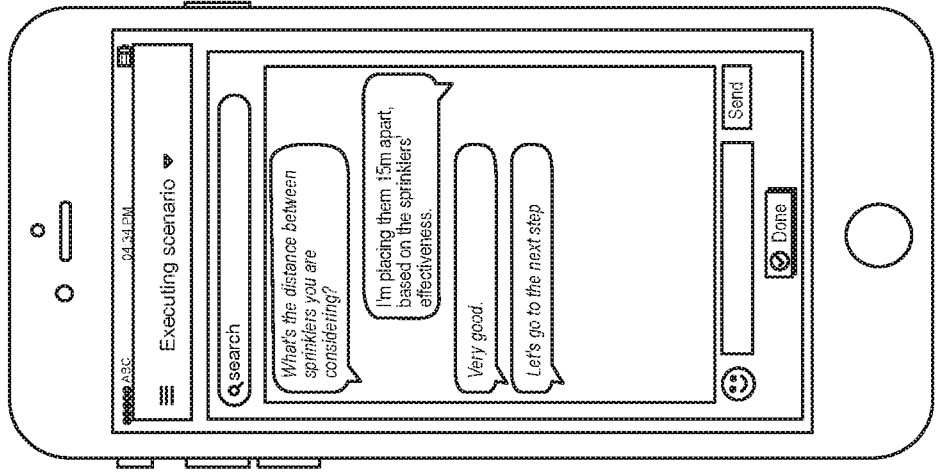
Figure 5F:
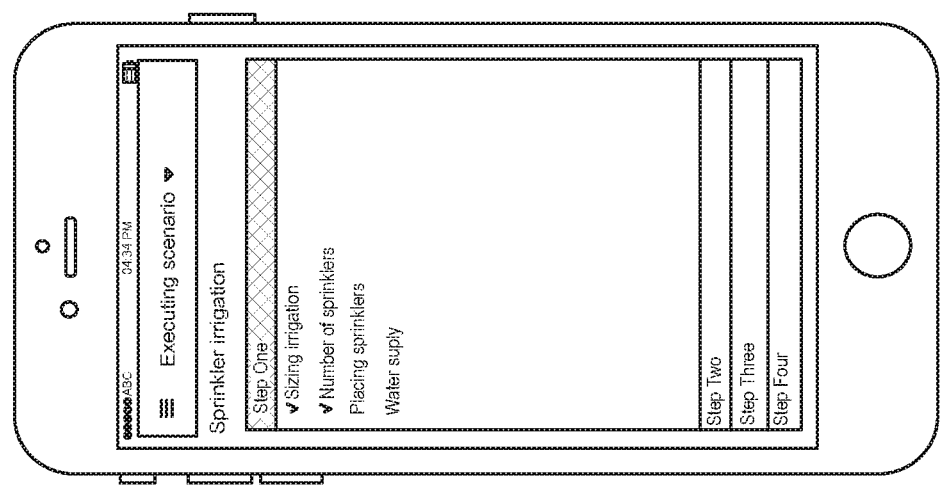

FIG. 5F shows an example user interface display, which presents execution of a scenario in one embodiment. For instance, a user selecting to confirm or start a recommended action may start executing an associated scenario. An example scenario is shown that includes "sprinkler irrigation." Procedures for executing "sprinkler irrigation" may be also displayed.

FIG. 5G shows an example user interface display, for example, of carrying on a conversation for supporting actions associated with the recommendation selected by a user. For instance, a conversational bot or the like may be employed to carry on a conversation. As an example, the evaluation of skills and expertise can be performed via a questionnaire (e.g., using Likert-scale), assessing skills and expertise involved in the selected scenario. In some embodiments, the chatbot can consider the same questions, but in a conversation format, evaluating the same skills and analyzing the expertise in each of them. As another example, a question database can be built based on literature information, for instance, books, tests, and/or others.

Figure 6:
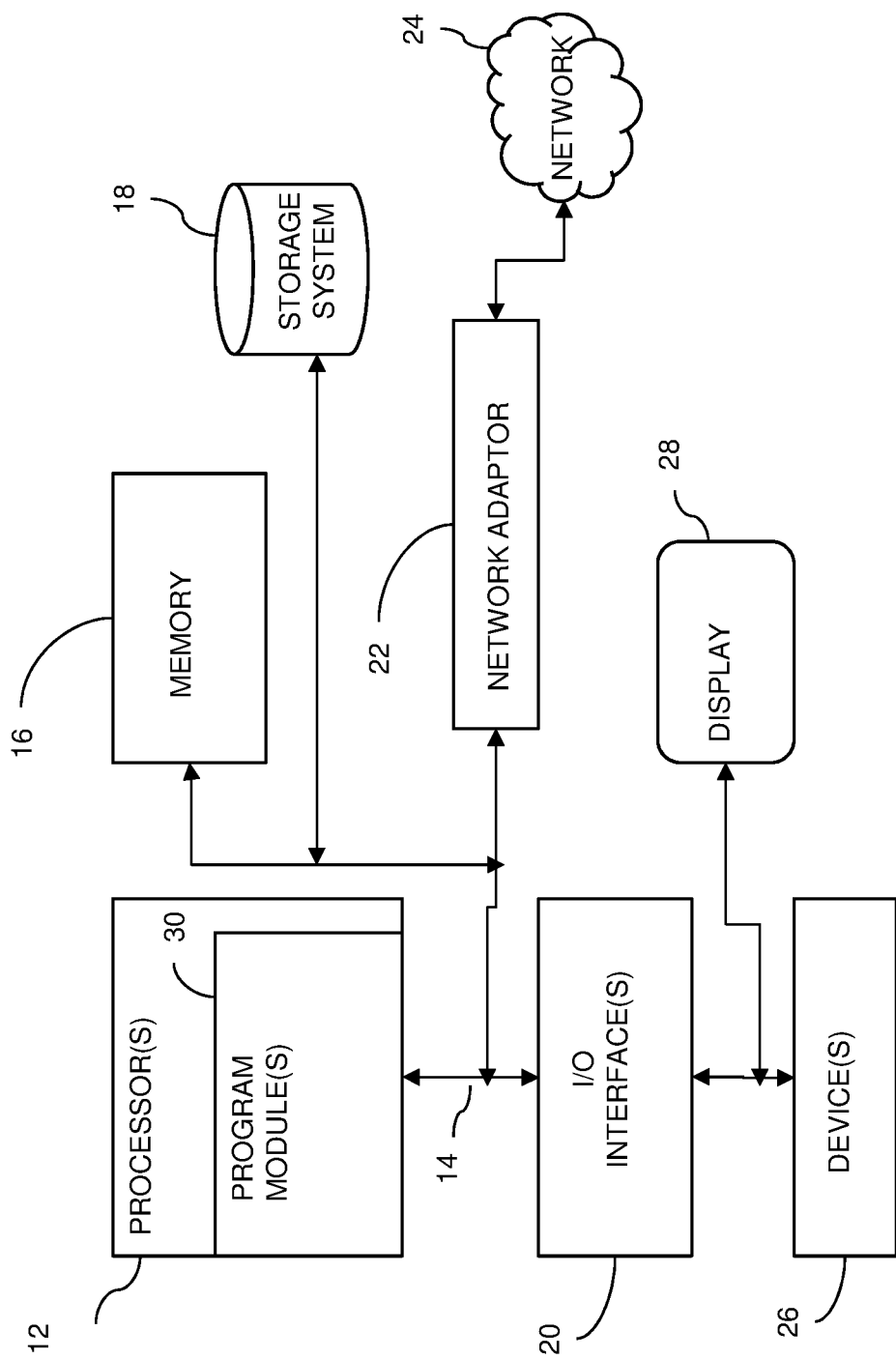
FIG. 6 illustrates a schematic of an example computer or processing system that may implement a system according to one embodiment.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one hardware processor coupled to a plurality of sensors sensing data associated with a farm;
   a memory coupled with the at least one hardware processor, the memory storing at least one crop model;
   the at least one hardware processor operable to cause an application including at least a chat bot application to execute, the chat bot application carrying on a conversation with a user via a user interface, the at least one hardware processor operable to identify a user expertise level from the conversation;
   the at least one hardware processor operable to receive farm attributes and production data, and trigger an execution of the at least one crop model based on at least the farm attributes and the production data, wherein executing the at least one crop model generates a plurality of farming scenarios specifying specific actions to perform associated with a farming topic;
   the at least one hardware processor operable to receive a production goal, and based on the production goal and the user expertise level, filter the plurality of farming scenarios to generate at least one candidate scenario, and present the at least one candidate scenario to the user,
   the user expertise level determined further based on a result of the user performing at least one of the specific actions generated by the at least one crop model, the result received from a sensor measuring a soil property of the farm.

2. The system of claim 1, wherein the at least one hardware processor is further operable to execute the scenario selected by a user, the executing comprising the application guiding the user via a conversational session with a recommendation for a step in the scenario.

3. The system of claim 2, wherein the at least one hardware processor is further operable to assess the user expertise level based on a user action applied to the step.

4. The system of claim 3, wherein the at least one hardware processor is further operable to automatically adjust a next recommendation for a next step in the scenario based on the assessed user expertise level.

5. The system of claim 3, wherein the application comprises a chat bot.

6. The system of claim 5, wherein the application comprises a mobile app.

7. The system of claim 4, wherein the at least one hardware processor is further operable to store the user expertise level in a database storing expertise levels per user.

8. A computer-implemented method comprising:
   receiving attributes associated with a farming area and production data associated with the farming area;
   identifying user expertise level by causing a chat bot to carry on a conversation with a user;
   receiving real-time sensor data associated with the farming area;
   executing at least one crop model, the executing the at least one crop model generating a plurality of scenarios specifying specific actions to perform associated with a farming topic;
   receiving a production goal associated with the farming area;

based on the production goal and the user expertise level, filtering the plurality of farming scenarios to generate at least one candidate scenario; and presenting the at least one candidate scenario to the user, the user expertise level determined further based on a result of the user performing at least one of the specific actions generated by the at least one crop model, the result received from a sensor measuring a soil property of the farm.

9. The method of claim 8, further comprising:
executing the scenario selected by a user, the executing comprising an application guiding the user via a conversational session with a recommendation for a step in the scenario.

10. The method of claim 9, further comprising:
assessing the user expertise level based on a user action applied to the step.

11. The method of claim 10, further comprising automatically adjusting a next recommendation for a next step in the scenario based on the assessed user expertise level.

12. The method of claim 10, wherein a mobile app runs a conversation session with the user, and the assessing of the user expertise is performed at least based on a dialog with the user in the conversation session.

13. The method of claim 11, further comprising storing the user expertise level in a database storing expertise levels per user.

14. A computer program product comprising a computer readable storage medium having program instructions embodied therewith, the program instructions executable by a device to cause the device to:
receiving attributes associated with a farming area and production data associated with the farming area;
identifying user expertise level by causing a chat bot to carry on a conversation with a user;
receiving real-time sensor data associated with the farming area;
executing at least one crop model, the executing the at least one crop model generating a plurality of scenarios specifying specific actions to perform associated with a farming topic;
receiving a production goal associated with the farming area;
based on the production goal and the user expertise level, filtering the plurality of farming scenarios to generate at least one candidate scenario; and
presenting the at least one candidate scenario to the user, the user expertise level determined further based on a result of the user performing at least one of the specific actions generated by the at least one crop model, the result received from a sensor measuring a soil property of the farm.

15. The computer program product of claim 14, further comprising:
executing the scenario selected by a user, the executing comprising an application guiding the user via a conversational session with a recommendation for a step in the scenario.

16. The computer program product of claim 15, further comprising:
assessing the user expertise level based on a user action applied to the step.

17. The computer program product of claim 15, further comprising automatically adjusting a next recommendation for a next step in the scenario based on the assessed user expertise level.

18. The computer program product of claim 15, wherein a mobile app runs a conversation session with the user, and the assessing of the user expertise is performed at least based on a dialog with the user in the conversation session.

19. The computer program product of claim 16, further comprising storing the user expertise level in a database storing expertise levels per user.

* * * * *